Patented Dec. 15, 1931

1,836,919

UNITED STATES PATENT OFFICE

FRITZ HANSGIRG, OF VIENNA, AUSTRIA, ASSIGNOR TO AMERICAN MAGNESIUM METALS CORPORATION, OF PITTSBURGH, PENNSYLVANIA, A CORPORATION OF DELAWARE

PROCESS FOR THE PRODUCTION OF HYDROGEN   REISSUED

No Drawing. Application filed May 29, 1930, Serial No. 457,500, and in Austria June 18, 1929.

This invention relates to a process for the production of hydrogen, low in or free from carbon monoxide, and for eliminating carbon monoxide from water gas or from gaseous mixtures of similar composition.

The decomposition of water by means of incandescent carbon (preparation of water gas) proceeds in accordance with the equation $$2C + 2H_2O = 2CO + 2H_2 - 57.2 \text{ kilogram cals.} \quad (I)$$

At lower temperatures, below 1,000° C., $CO_2$ is formed, in addition to CO, in accordance with the equation $$C + 2H_2O = CO_2 + 2H_2 - 18.0 \text{ kilogram cals.} \quad (II)$$

A state of equilibrium, dependent on the temperature, is established between CO and $CO_2$, which is displaced, in favor of the CO, at high temperature. Since theoretically, the formation of hydrogen according to Equation II leads to a gaseous mixture free from carbon monoxide and, in addition requires a far smaller expenditure of heat, it would be of advantage to conduct the hydrogen process in accordance with that equation. The gaseous mixture obtained at lower temperature would also be the most suitable for the technical recovery of hydrogen, since the precipitation of carbon dioxide is far simpler, in practice than the elimination of carbon monoxide. The difficulty, however, arises that the reaction velocity, which becomes progressively smaller as the temperature falls, is far too slow for practical working at those temperatures at which the equalibrium is established in favor of Equation II.

Formerly, attempts were frequently made to overcome this inconvenience, especially in order to make possible the direct recovery of hydrogen, almost free from carbon monoxide, by conducting the process in accordance with Equation II. In order to increase the velocity of the reaction, it has been proposed, inter alia, to employ hydrates or carbonates of the alkalis, or the corresponding water-soluble compounds of the alkaline earths as catalysts. According to this known process, materials containing carbon, impregnated with the said water-soluble compounds, were to be exposed, in an incandescent state, to the action of ordinary or super-heated steam.

The proposals advanced in this direction, however, did not prove successful, and consequently, for the technical recovery of hydrogen from water gas, the water gas process was allowed to proceed at high temperature, the carbon monoxide being then removed from the resulting gaseous mixture in a separate working operation.

This result was secured, in adition to liquefaction, chiefly by oxidizing the carbon monoxide to carbon dioxide by the aid of steam and with the agency of catalysts. This process is economical, if the oxidation of the carbon monoxide be carried out under high pressure, but, in its really valuable methods of procedure, it is by no means simple, and at the same time, furnishes a mixture of hydrogen and carbon dioxide, which still always contains carbon monoxide, even though in small amounts, so that a chemical purification (such as washing the gas with solutions of cuprous salts) is still necessary in order to obtain pure hydrogen.

Another process for the recovery of pure hydrogen from water gas containing carbon monoxide, has recourse, in the oxidation of the carbon monoxide by means of steam, to fixing the carbon dioxide by substances capable of absorbing same, lime in particular, for accelerating the reaction. By the continuous removal of the carbon dioxide from the reaction mixture, the equilibrium associated with the reaction $CO + H_2O = H_2 + CO_2$ is displaced in favor of the carbon dioxide. In carrying out this process, the water gas is passed, together with an excess of steam, over lime which is heated, in a retort, to a temperature below the decomposition temperature of calcium carbonate. An addition of catalytic substances has been found to facilitate the reaction. As carbon dioxide-absorbing substance lump lime is preferably employed, which is rapidly transformed into calcium carbonate, even in the interior, during the passage of the water gas. From this carbonate, quick lime is recovered by calcining, and is again brought into reaction with water gas. Further proposals have been made, in order to improve this process, the employment of steam in exactly, or approximately, stoichiometric proportions being particularly recommended.

The present invention solves, in the first place, the problem of the direct production of a mixture of hydrogen and carbon dioxide, low in, or free from, carbon monoxide, by the action of steam on carbon (or substances containing carbon), in the presence of additions which accelerate the reaction, and under conditions substantially approximating Equation II of the water gas process. According to the invention, the process is conducted with the employment of magnesia, magnesium carbonate or magnesium hydroxide, as catalysts, at a temperature which, though, above the decomposition temperature of magnesium carbonate, does not substantially exceed 750° C.

The invention is based upon the fact that the equilibria associated with the reaction $2CO \rightleftarrows C+CO_2$, are of decisive importance for the production of hydrogen free from carbon monoxide. From this point of view, the temperature of 500° C. is the most favorable temperature for the reaction, in that, at this temperature, the equilibrium is practically completely displaced, in favor of carbon dioxide. Above 500° C., $CO_2$ in the presence of C, is reconverted into CO to an increasing extent as the temperature rises, so that, for the formation of a gaseous mixture low in carbon monoxide, the range of temperature above 750° C., is not longer to be considered. Below 700–750° C., however, the reaction velocity of the hydrogen process is already retarded to such an extent that the reaction cannot be carried out on a technical scale. The problem therefore arose of finding an effective and insensitive contact mass which will enable the reaction velocity of the formation of hydrogen to be sufficiently increased in the range of temperature below 750° C. A mixture of carbon with magnesium carbonate has been found admirably suited for the purpose. This is based on the relatively low decomposition temperature of magnesium carbonate, which can be reduced to even below 500° C. by diluting the gas phase with steam, and thereby lowering the partial pressure of the carbon dioxide.

At 500° C. the reaction $$MgCO_3 \rightleftarrows MgO + CO_2$$

occurs to form an equilibrium, when the amounts of steam employed correspond to the stoichiometrical proportions of Equation II, or only slightly exceed those proportions. Magnesium carbonate therefore has the capacity of rapidly absorbing, and again parting with, carbon dioxide in the hydrogen process conducted in accordance with Equation II, at the optimum temperature suitable for reliably preventing the formation of carbon monoxide. This is not the case, either with the alkali carbonates or calcium carbonate. According to the invention, the performance of the hydrogen process with the use of magnesium carbonate as catalyst, at temperatures which do not substantially exceed 500° C., enables hydrogen, practically free from carbon monoxide, to be obtained directly.

If, for example, wood charcoal be mixed with magnesium carbonate, in the proportions of 100 parts by weight of charcoal to 5–25 parts by weight of magnesium carbonate, and such mixture be treated, at about 500° C., with the stoichiometrical amount of steam (corresponding to 2 molecules of $H_2O$ to 1 mol. of C.), the reaction proceeds in practical accordance with Equation II and with quite sufficient velocity. The process is also of importance for the production of hydrogen itself. However, since, as is known, the carbon dioxide can be easily separated from this mixture, the process primarily affords a practically applicable method for the recovery of pure hydrogen.

Of course, magnesium oxide or hydroxide, which are immediately converted into magnesium carbonate, can be introduced into the reaction in place of magnesium carbonate. The process can also be carried out with crude materials which contain magnesium oxide or hydroxide in sufficient amount. The catalyst remains unaltered in composition and active, without regeneration, so that only the gasified carbon has to be replaced. Since the course of the reaction for the formation of hydrogen in accordance with Equation II is slightly endothermic, the reaction temperature of approximately 500° C. can be maintained by the application of a very small amount of heat.

Instead of gasifying charcoal with steam, in the specified manner, for the direct production of a mixture of hydrogen and carbon dioxide, free from carbon monoxide, the process may also be employed for the complete elimination of carbon monoxide from water gas, or other gaseous mixtures of similar composition, containing same. For this purpose, the gas, or gaseous mixture, containing carbon monoxide, is also passed, in association with steam, over a mixture of charcoal (or substances containing carbon) and magnesium carbonate, which is maintained at a temperature above the decomposition temperature of magnesium carbonate, but not substantially exceeding 500° C. The course of the reaction may be expressed by the following equations:

$$2CO = C + CO_2$$
$$C + 2H_2O = CO_2 + 2H_2$$
$$\overline{2CO + 2H_2O = 2CO_2 + 2H_2}$$

Since the reaction $2CO = C + CO_2$ is decidedly exothermic, only a very small supply of heat from outside is required also in this case, in order to maintain the temperature at about 500° C. If, in this method of carrying out the process, the amount of steam added be only just sufficient for the carbon formed in accordance with the equation $2CO = C + CO_2$ to combine, in the nascent state, with the steam, in accordance with the Equation II of the hydrogen process, and form carbon dioxide, the catalytic material will remain entirely unaltered. The process can be carried out quietly, without any further addition of carbon being needed. In any event, however, no reactivation of the catalyzer material is required, because, even in this case, the working temperature is higher than the decomposition temperature of the magnesium carbonate.

It is sufficient to bring the gases, prior to their passing out of the apparatus, into contact, for 20–30 seconds, with a layer of contact material which is maintained at a temperature not substantially exceeding 500° C. With this proviso, zones of the contact material which are traversed by the gases in an earlier stage, can also be heated to temperatures between 500 and 750° C., for the purpose of accelerating the reaction.

*Example 1*

An intimate mixture of wood charcoal and calcined magnesite, and containing, for example, 1 part by weight of magnesium oxide for every 4 parts by weight of charcoal, is allowed to descend through an externally heated shaft furnace in which the contact mass is maintained at about 500° C. Steam is passed, in counter flow, through the descending charge. The contact mass, low in charcoal, issuing at the lower end of the shaft is again mixed with sufficient added charcoal to restore the desired magnesium oxide-charcoal ratio, above noted, and the resulting mixture is returned into the top of the shaft furnace, thus permitting a cyclic operation of the process. In this manner, 30–40% of the introduced carbonaceous substance can be converted per hour. The shaft furnace may also be replaced by a rotary tube furnace, operated in a similar manner.

If the carbon dioxide be removed from the resulting hydrogen (free from carbon monoxide) in the known manner, for example by washing with water under pressure, this very simple process furnishes perfectly pure hydrogen, in a direct manner, that is, without any chemical purification being required.

*Example 2*

An intimate mixture is prepared from finely ground, calcined magnesite and wood charcoal, in the proportions of 1:4 to 1:5, and a granular mass is formed by the addition of a binding agent, such as a solution of an alkali carbonate. The contact mass is preferably introduced into externally heated tubes. The gaseous mixture to be purified is passed over the heated contact mass in association with the stoichiometric amount of steam, in the proportion 1 mol. $H_2O$ : 1 mol. $CO$.

Under these conditions, any desired quantities of gaseous mixtures containing carbon monoxide can be converted into carbon dioxide with one and the same charge of contact material, without any increase or diminution of the initial amount of the latter, provided the amount of steam employed corresponds to the carbon monoxide content.

According to a process heretofore proposed, metallic nickel and cobalt, deposited on pumice or other porous carriers, are employed for eliminating the carbon monoxide from water gas, by oxidizing it to carbon dioxide at a temperature of 350–450° C. Within the scope of this process, it is also proposed, by the subsequent or simultaneous passage of steam, to utilize the carbon, deposited in accordance with the reaction

$$2CO = CO_2 + C,$$

for the process, in accordance with equation $C + 2H_2O = 2H_2$. The value, as an improvement, of the present process which, by the employment of a very cheap and insensitive contact mass, solves the problem of the direct gasification of a carbonaceous material such as charcoal in the presence of steam to form hydrogen, low in, or free from, carbon monoxide, and also enables the complete subsequent elimination of carbon monoxide from mixtures of the same kind containing the latter, becomes particularly apparent by comparison with the said known process which merely aims to free water gas from carbon monoxide by subsequent oxidation with the aid of expensive and sensitive catalysts.

What I claim is:

1. The process of obtaining hydrogen, including reacting a mixture of carbon monoxide and steam with an intimate mixture of a carbonaceous material and an oxygen compound of magnesium.

2. The process of obtaining hydrogen, including reacting a mixture of carbon monoxide and steam with an intimate mixture of a carbonaceous material and an oxygen compound of magneisum at a temperature of substantially 500° C.

3. The process of obtaining hydrogen, including reacting a mixture of carbon monoxide and steam with a mixture of charcoal and magnesium carbonate.

4. The process of obtaining hydrogen, including reacting a mixture of water gas and steam with a mixture of charcoal and magnesium carbonate.

5. The process of obtaining hydrogen, including reacting a mixture of water gas and steam with a mixture comprising 100 parts of charcoal and 5 to 25 parts of magnesium carbonate.

6. The process of obtaining hydrogen, including reacting a mixture of water gas and steam with an intimate mixture of a carbonaceous material and magnesium oxide.

7. The process of obtaining hydrogen, including reacting a mixture of water gas and steam with an intimate mixture of a carbonaceous material and magnesium hydroxide.

8. The process of obtaining hydrogen, including reacting a mixture of water gas and steam in the proportion of 1 mol. $H_2O$ : 1 mol. CO with a mixture of finely ground magnesite and wood charcoal in the proportion of 1:4 to 1:5.

9. The process of obtaining hydrogen, including reacting a mixture of a carbon monoxide-containing gas and steam with a mixture of a carbonaceous material and an oxygen compound of magnesium at a temperature of substantially 500° C., whereby to form hydrogen and carbon dioxide according to the equation $$2CO + 2H_2O = 2CO_2 + 2H_2;$$

and washing the so-formed reaction products with water under pressure to remove the carbon dioxide.

10. A process of producing hydrogen, comprising passing a mixture of carbon monoxide and steam, through a mixture of an oxygen compound of magnesium and a carbonaceous material, at a temperature below 750° C.

11. A process of producing hydrogen, comprising passing a mixture of water gas and steam, through a mixture of an oxygen compound of magnesium and a carbonaceous material, at a temperature below 750° C.

In testimony whereof I have affixed my signature.

FRITZ HANSGIRG.